(12) United States Patent
Westmattelmann et al.

(10) Patent No.: US 7,976,627 B2
(45) Date of Patent: Jul. 12, 2011

(54) METHOD AND DEVICE FOR THE PRODUCTION OF A HYDRAULIC BINDING AGENT

(75) Inventors: Ralf Bernard Westmattelmann, Paderborn (DE); Michael Enders, Münster (DE)

(73) Assignee: Polysius AG, Beckum (DE)

( * ) Notice: Subject to any disclaimer, the term of this patent is extended or adjusted under 35 U.S.C. 154(b) by 1002 days.

(21) Appl. No.: 10/571,492

(22) PCT Filed: Sep. 16, 2004

(86) PCT No.: PCT/EP2004/010403
§ 371 (c)(1),
(2), (4) Date: Mar. 9, 2006

(87) PCT Pub. No.: WO2005/030669
PCT Pub. Date: Apr. 7, 2005

(65) Prior Publication Data
US 2006/0288911 A1    Dec. 28, 2006

(30) Foreign Application Priority Data
Sep. 23, 2003    (DE) .................. 103 44 040

(51) Int. Cl.
*C04B 7/38* (2006.01)
*C04B 7/36* (2006.01)

(52) U.S. Cl. ........................ 106/739; 106/743
(58) Field of Classification Search ............ 106/745, 106/739, 743
See application file for complete search history.

(56) References Cited

U.S. PATENT DOCUMENTS

| | | | | |
|---|---|---|---|---|
| 3,233,973 A | * | 2/1966 | Veo et al. ............. | 106/743 |
| 3,401,891 A | * | 9/1968 | Fleeman et al. ........ | 241/34 |
| 3,402,895 A | * | 9/1968 | Willmann .............. | 241/36 |
| 3,602,488 A | * | 8/1971 | Romig ................. | 432/55 |
| 4,026,717 A | * | 5/1977 | Harris et al. .......... | 106/743 |
| 4,047,434 A | * | 9/1977 | Marsh et al. .......... | 73/304 R |

(Continued)

FOREIGN PATENT DOCUMENTS

EP    0911303 A    4/1999

(Continued)

OTHER PUBLICATIONS

JP 11180742 (Jul. 6, 1999) Arai et al. abstract only.*

(Continued)

*Primary Examiner* — Paul Marcantoni
(74) *Attorney, Agent, or Firm* — Stites & Harbison PLLC; Douglas E. Jackson

(57) ABSTRACT

The invention relates to a method and to apparatus for the production of a hydraulic binding agent from a plurality of raw material components (12a to 12e), wherein the raw material components are ground to a raw meal, the raw meal is burned to clinker in a combustion plant (2) and finally the clinker is ground together with further inter-grinding materials. Moreover, the mineralogical and/or chemical composition of the raw meal and/or the clinker is analyzed, at least two separate raw meal silos/clinker silos (4a to 4h, 5a to 5g) are provided in each case for the raw meal and/or the clinker and are filled with raw meal/clinker of different mineralogical and/or chemical composition. Furthermore the composition of the raw meal to be burned and/or of the clinker to be ground is fixed by controlled extraction as a function of the analysed composition of the raw meal/clinker from one or a plurality of raw meal silos/clinker silos.

10 Claims, 2 Drawing Sheets

U.S. PATENT DOCUMENTS

Figure 1:
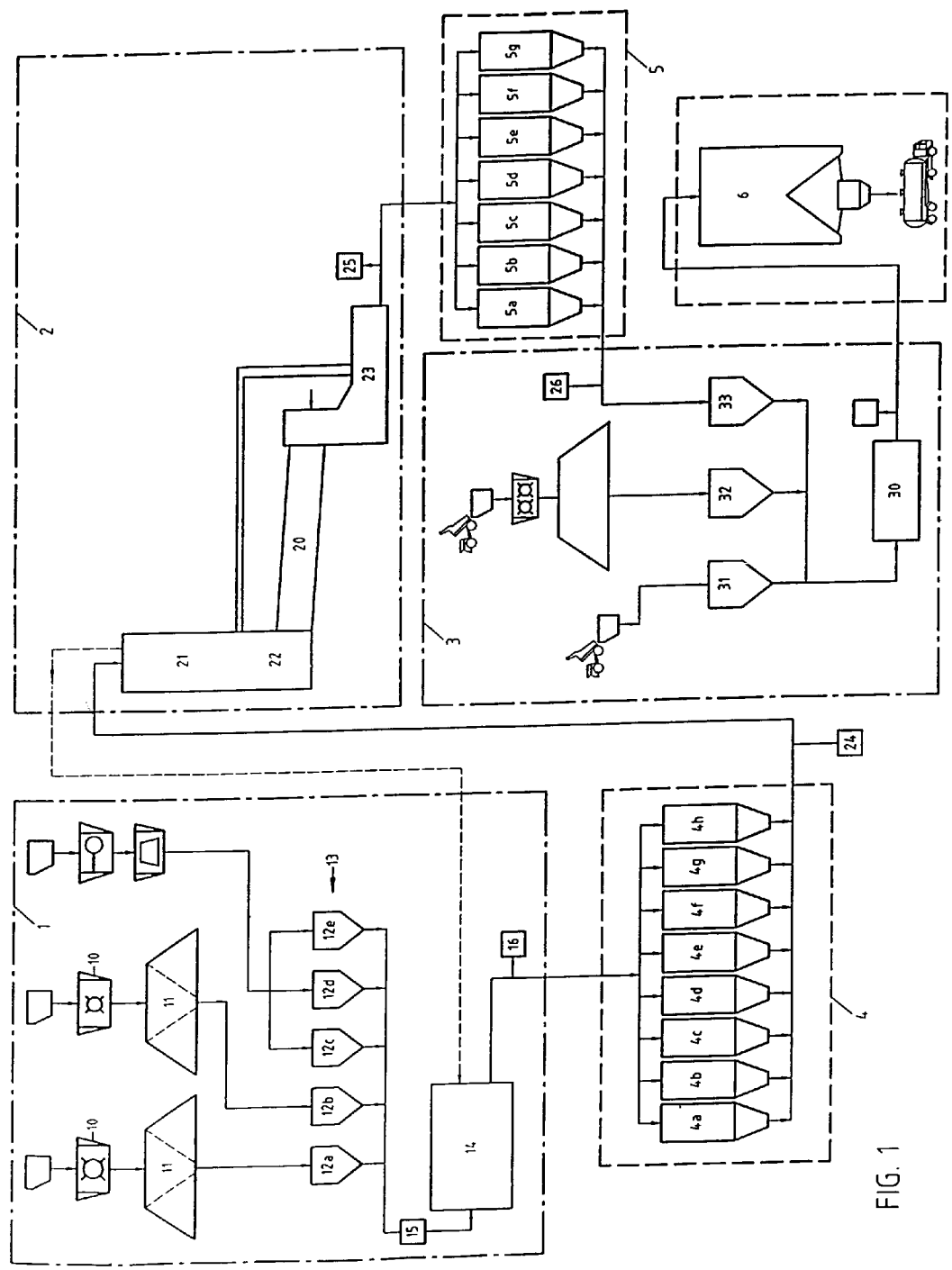

| | | | |
|---|---|---|---|
| 4,363,448 A * | 12/1982 | Machler et al. | 241/10 |
| 4,395,290 A * | 7/1983 | Oller et al. | 106/743 |
| 5,494,515 A | 2/1996 | Young | |
| 5,754,423 A * | 5/1998 | Teutenberg et al. | 700/173 |
| 6,391,105 B1 | 5/2002 | Oates et al. | |
| 2004/0157181 A1 | 8/2004 | Arnold et al. | |

FOREIGN PATENT DOCUMENTS

| | | | |
|---|---|---|---|
| EP | 0995726 A | | 4/2000 |
| JP | 11180742 | * | 7/1999 |
| WO | WO 02/22246 A | | 3/2002 |
| WO | WO 02/083279 A | | 10/2002 |

OTHER PUBLICATIONS

JP 11180742 (Jul. 6, 1999) Arai et al. English Machine Translation. pp. 1-12.*

JP 11180742 (Jul. 6, 1999) Arai et al. English Machine Translation p. 1-12.*

* cited by examiner

METHOD AND DEVICE FOR THE PRODUCTION OF A HYDRAULIC BINDING AGENT

The invention relates to a method and apparatus for the production of a hydraulic binding agent from a plurality of raw material components, wherein the raw material components are ground to a raw meal, the raw meal is burned to clinker in a combustion plant and finally the clinker is ground together with further inter-grinding materials.

In the production of cement clinker, in the process section of preparation of the raw material the principal oxides CaO, $Al_2O_3$, $Fe_2O_3$ und $SiO_2$ from materials such as for example limestone, marl, clay, bauxite, iron ore, sand, etc. are mixed in such a way that the ratios of the CaO to the other three oxides, of the $SiO_2$ to the alumina and iron oxide as well as of the alumina to the iron oxide lie within a desired value range. These three ratios, also referred to as raw material modules, are, in addition to the further subordinate characteristic quantities for the subsidiary components, the most important characteristic quantities of quality of the raw meal, since by means of these the mineralogical main phases of the cement clinker C3S, C2S, C3A and C4AF (in cement notation) and thus the properties of the cement clinker can be set. However, alkalis, sulphates, halogens and further elements contained in smaller mass fractions are also of considerable importance for the properties of the clinker minerals.

In addition to the necessary fine grinding for the clinker burning process, the preparation of the raw material has to ensure the drying and homogeneity of the modules—expressed as a standard deviation from the desired mean values.

Nowadays the cement clinker is usually burned in a clinker production line comprising a preheater, calciner, rotary kiln and clinker cooler. In the cement grinding installation the cement clinker is the ground by addition of a sulphate admixture as setting regulator and further inter-grinding materials, such as for example granulated blast furnace slag, fly ash, pozzolanas, limestone and burnt oil shale, to produce different cements with their respective properties. The said process sections of preparation of the raw material, clinker burning and cement grinding are each separated by stores. These stores provide a stock of material in order to break the link between the availability of a part of the installation and the readiness for operation of the other parts of the installation. Furthermore, especially between preparation of the raw material and clinker burning the fluctuations in the characteristic quantities of quality are damped by the silo in order to achieve the most constant possible quality of the raw meal. The characteristic quantities of quality of the individual process sections are checked by periodic sampling after the individual process sections and the values determined are used within the context of regulation for changes to control variables upstream in the material.

This procedure is associated with the following technical and economic disadvantages:

The characteristic quantities of quality which are most important for the cement end product, but not the only ones, are compression strength as a function of time, beginning and end of setting, water requirement to standard stiffness, sulphate resistance, etc. Some of these characteristic quantities can still be influenced by the last process section of cement grinding, since significant properties have already been influenced or adjusted in the preceding process sections. Thus the raw material modules influence the mass ratio of the clinker phases produced, which in turn have a primary influence on the properties of the cement. However, the prior calculation of the clinker phases, e.g. by the Bogue method, is only sufficiently reliable when the subsidiary and trace elements are present in small quantities. Especially in the economically important use of waste-derived fuels or waste materials from other industries—in the context of a composite process—the prediction of clinker phases and thus cement properties is not possible with sufficient precision. Furthermore the clinker phases are not distributed homogeneously over the clinker grain size distribution.

A further disadvantage results from the size of the stores which is frequently fixed by considerations of availability and implies a high dead time and thus leads to a low flexibility in the adaptation of the product quality to changed production conditions. In raw material silos, which when completely full hold a stock for e.g. 1 to 2 days, an economically advantageous change of fuel cannot take place in a short time without lasting change to the product quality.

A method and apparatus is known from WO-A-02/083279 in which a plurality of silos are provided for storage of the raw meal, wherein the individual silos are filled one after the other with the raw meal and the raw meal is extracted simultaneously from a plurality of silos. In this way a high rate of homogenisation is achieved, whereby a constant and stable combustion process is ensured. However, this method also does not allow a change of fuel in a short time without lasting change to the product quality.

The object of the invention, therefore, is to propose a method and apparatus by which the long dead times resulting from the sizes of the stores are avoided and additionally it is possible to influence the characteristic quantities of quality downstream with respect to the material flow direction of the process sections set out above.

This object is achieved according to the invention by the features of claims 1 and 8 respectively.

In the method according to the invention for the production of a hydraulic binding agent from a plurality of raw material components the raw material components are ground to a raw meal, the raw meal is burned to clinker in a combustion plant and finally the clinker is ground together with further inter-grinding materials. Furthermore the mineralogical and/or chemical composition of the raw meal and/or the clinker is analysed, wherein at least two separate raw meal silos/clinker silos are provided in each case for the raw meal and/or the clinker and are filled with raw meal/clinker of different mineralogical and/or chemical composition, and wherein the composition of the raw meal to be burned and/or of the clinker to be ground is fixed by controlled extraction as a function of the analysed composition of the raw meal/clinker from one or a plurality of raw meal silos/clinker silos. In this way a targeted regulation of the product quality takes place.

The apparatus according to the invention for the production of a hydraulic binding agent from a plurality of raw material components basically comprises a grinding apparatus for grinding of the raw material components to raw meal, a combustion plant for burning of the raw meal to clinker and a cement grinding installation for grinding of the clinker, wherein at least one analysing means is provided for analysis of the mineralogical and/or chemical composition of the raw meal and/or of the clinker. Furthermore the apparatus has a raw meal silo installation and/or a clinker silo installation, wherein at least two separate raw meal silos/clinker silos are provided in each case for the raw meal and/or the clinker. By way of a control device the raw meal silos/clinker silos are filled as a function of the mineralogical and/or chemical composition of the raw meal/clinker. Furthermore, by way of the control device the composition of the raw meal to be burned and/or of the clinker to be ground is fixed by controlled extraction as a function of the analysed composition of the raw meal/clinker from one or a plurality of raw meal silos/clinker silos.

In the method known from WO-A-02/083279 fluctuations in the raw meal composition can only be compensated for by a mean value (homogenisation), whereas according to the invention the composition of the raw meal is only fixed after the grinding operation as a function of the analysed composition of the ground raw material components by targeted extraction from the raw meal silos.

Further embodiments of the invention are the subject matter of the subordinate claims.

According to a preferred embodiment the mineralogical and/or chemical composition of the clinker is determined and used for control of the extraction of the raw meal from the raw meal silos.

According to a further embodiment individual raw material components are at least partially ground separately and stored in separate raw meal silos.

Furthermore, the filling of the clinker silos and the extraction of the clinker from one or a plurality of clinker silos are regulated as a function of the desired mineralogical and/or chemical composition of the cement to be created.

For determination of the mineralogical and/or chemical composition of the raw meal/clinker samples which are fractionated according to grain size and/or density samples can be taken and analysed. It is also an object of the present invention to carry out the filling of the raw meal silos/clinker silos by fractionation by means of screening or sifting according to grain size and/or density.

For the storage of materials, the various silos can be specifically filled with materials with different characteristic quantities of quality. The filling can take place either on the basis of a simple direction of the material stream to a silo by way of a switch or also on the basis of a classification according to grain sizes or densities by screening or sifting. In this way it is possible to take into account of the fact that cement clinker has a concentration of the clinker phases which varies according to grain size.

The chemical/mineralogical sample analysis systems are disposed before the silos and after the subsequent process section and on the basis of the measured values determined in periodic intervals before the filling allow the decision concerning the silo(s) in which the sample material is stored and on the basis of the characteristic quantities of quality achieved after the subsequent process section allow the decision concerning the quantities of material to be extracted from the individual silos. The results of the analysis in connection with filling time, filling quantity and filling location are stored temporarily for further regulation.

According to the prior art the method of X-ray diffractometry with quantitative evaluation by the Rietveld method is usually used for the clinker phase determination and an X-ray fluorescence method is used for the determination of the raw material modules. However, other alternative or supplementary methods are also possible.

In this case the individual silos or silo compartments, in particular on the raw meal side, are advantageously constructed in such a way that a mass flow is ensured. As a result horizontal layers are produced in the silo compartments with known characteristics of quality. By the separation of the storage according to characteristic quantities of quality and the controlled emptying of each individual compartment it is possible to regulate the characteristic quantities of quality in a targeted manner in the subsequent process.

The clinker silo can also be formed simply by a stockpile separated by walls or partitions.

The sample analysis systems generally comprise the components of sampling, sample preparation and measurement as well as a control means and software for the evaluation and analysis of measurement data. Moreover the sampling can also comprise additional fractionating devices by density and/or grain size.

If such a system is used not only for the raw meal between preparation of the raw material and clinker burning but also for the clinker between clinker burning and cement grinding, then the emptying of the individual raw meal silos can be regulated using the characteristic quantities of quality determined by the clinker sample analysis system. In this way unpredictable changes can be stabilised by secondary fuels or secondary raw materials—e.g. brown coal fly ash, tyres, domestic refuse—on the clinker phases.

In combined grinding an unwanted chemical composition separated according to grain sizes is frequently observed. With the invention it is also advantageously possible to produce individual raw meal components by separate grinding and storage. The bringing together of separately ground raw meal components makes possible an improved control of the chemical composition irrespective of the grindability. Also corrective components which are distinguished by a high concentration of a principal oxide or of a subsidiary component, can be produced and stored separately for later corrections and if need be can be added to the mixture with short dead times.

Furthermore, the problems which exist when the proportioning of a raw material component fails can be avoided. In this case it is frequently no longer possible to maintain the required value range of the characteristic quantities of quality and no sufficient possibilities for correction exist in the further material flow. In this case the separate storage of individual components provides a time buffer in order to correct the errors in the recipe. With the present-day state of the art, in particular in the case of materials which are difficult to handle, such as for example strongly adhesive clay or returned filter dust, this leads to problems of availability of the plant, as the plant has to be stopped and the disruption has to be eliminated.

Further embodiments and advantages of the invention are explained in greater detail below with reference to the description and the drawings.

Figure 2:
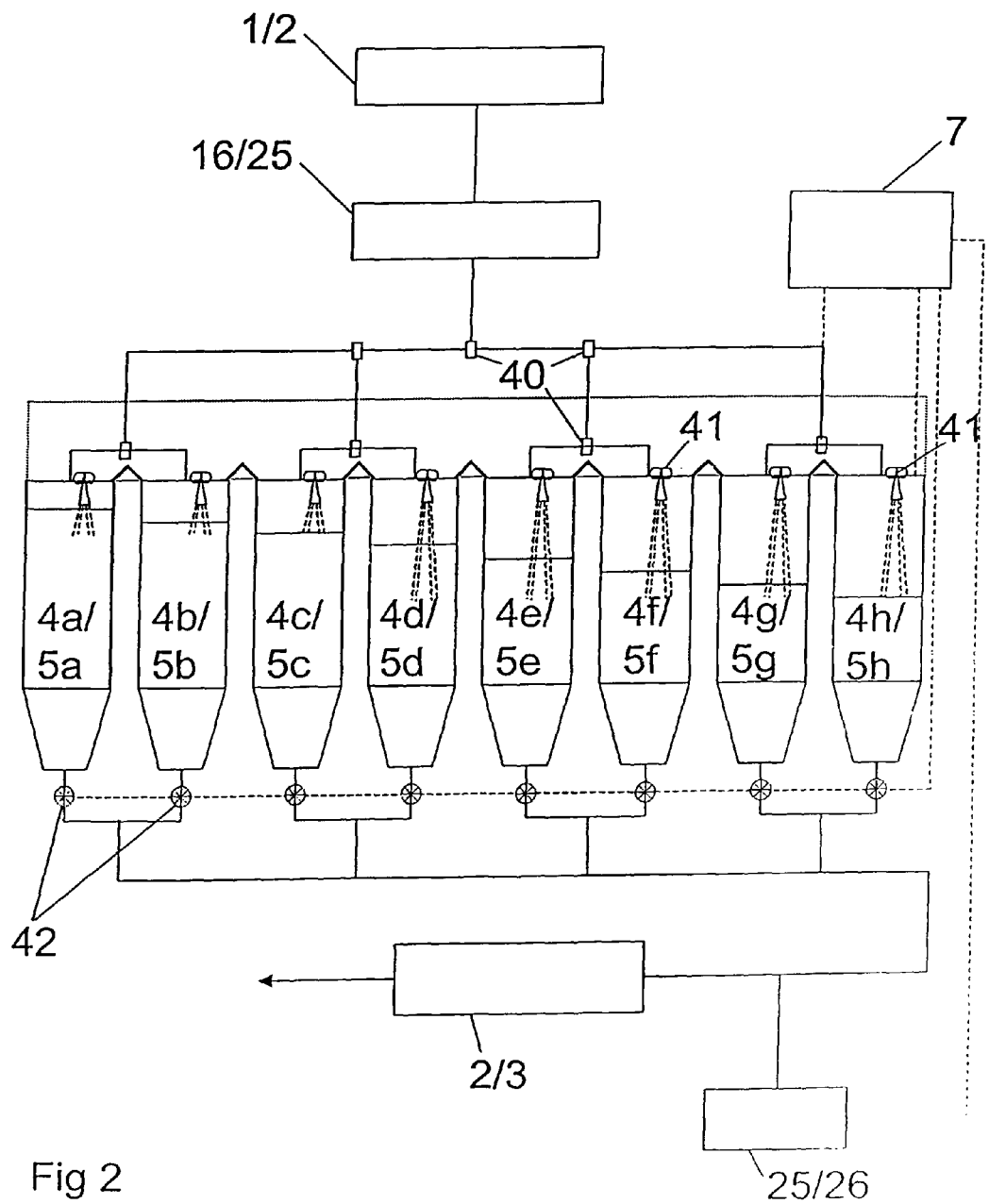

In the drawings:

FIG. 1 shows a schematic overview of a plant for the production of a hydraulic binding agent and FIG. 2 shows a schematic view of a raw meal silo installation/clinker silo installation.

The overview shown in FIG. 1 shows a plant for the production of a hydraulic binding agent, in particular cement and cement clinker.

It comprises the process sections for preparation of the raw material 1, clinker burning 2 and cement grinding 3. A raw meal silo installation 4 or a clinker silo installation 5 respectively is provided between the process sections. The finished ground cement arrives at a cement silo 6 into which it can be filled for further transport.

The raw material components 12a to 12e, such as lime, clay, iron ore, etc. which are necessary for the cement production are at least partially pre-comminuted in crushers 10 and then proceed via storage facilities into separate storage bunkers 13. By means of proportioning devices which are not shown in greater detail the raw material components are extracted individually or jointly and ground to raw meal in a grinding apparatus 14.

An analysing means 15 for analysis of the the mineralogical and/or chemical composition of the raw material components can be provided before the grinding apparatus 14. Alternatively after the grinding apparatus 14 a further analysing means 16 can be provided, with the aid of which the mineralogical and/or chemical composition of the raw meal/raw meal components can be determined.

The raw meal then proceeds to the raw meal silo installation 4 which comprises a plurality of raw meal silos 4a to 4h. The individual raw meal silos can be constructed separately or as individual silo compartments are combined into multi-compartment silos. The plurality of raw meal silos offers the possibility of filling them with raw meal of different mineralogical and/or chemical composition. In this case individual raw material components 12a to 12e can at least be partially separately ground and stored in separate raw meal silos. In practice several raw material components can be advantageously ground jointly and other raw material components can be ground separately and stored in the raw meal silos. Naturally the possibility also exists of grinding various components with different quantitative ratios together and storing them. By means of the analysis device 16 it is possible at any time to have an idea of the composition of the material and the appropriate raw meal silo can be controlled in a targeted manner.

In the next process section the raw meal is burned to clinker. The process section "clinker burning" usually comprises a preheater 21, a calciner 22, a rotary kiln 20 as well as a clinker cooler 23. The raw meal is extracted by targeted extraction from one or a plurality of raw meal silos 4a to 4h in the desired composition and transported directly to the combustion plant 2. Thus the raw meal extracted from the raw meal silo is not only stored temporarily in collecting silo. In the combustion plant it is preheated in the preheater in counterflow to the exhaust gases from the rotary kiln, precalcined in the calciner and finally burned to clinker in the rotary kiln. The cooling then takes place in the clinker cooler 23 disposed downstream.

In an analysing means 24 the mineralogical and/or chemical composition of the raw meal extracted from the raw meal silos is determined. In a further sampling and analysing means 25 disposed in or after the clinker cooler 23 the mineralogical and/or chemical composition of the clinker is finally determined. In this case the samples can be separated into fractions according to density and grain size.

The burned clinker is delivered to the clinker silo installation 5 which also comprises a plurality of clinker silos 5a to 5g. Here too it is again possible for the filling of the individual clinker silos and the extraction of the clinker from one or a plurality of clinker silos to be regulated as a function of the desired mineralogical and/or chemical composition of the cement to be produced. An analysing means 26 determines the mineralogical and/or chemical composition of the clinker extracted from the clinker silos.

The finished cement comprises in addition to the clinker gypsum and further additives which are ground together in the cement grinding installation 3 in a mill 30. In order to ensure a uniform material flow to the mill 30, feed bins 31 (additives), 32 (gypsum) and 33 (clinker) are provided. The individual components are extracted by way of proportioning devices (which are not shown in greater detail) according to the desired composition and delivered directly to the cement grinding installation 3. Finally the ground cement enters the cement silo 6 and from there can be filled into suitable transport means.

Instead of an individual clinker feed bin 33 the various qualities of clinker can also be stored in a plurality of clinker feed bins and transported from there together with the other components to the mill. The analysing means 26 can then also be disposed between the feed bins and the mill 30.

The raw meal silo installation 4 is described in greater detail below with reference to FIG. 2. However, the following description also applies to the clinker silo installation 5. In order to avoid unnecessary repetitions, therefore, reference is made below basically to the raw meal silo installation 4. The reference numerals in connection with the clinker silo installation 5 are additionally given after the oblique stroke.

The first process, in this case the preparation of the raw material, is identified by the reference numerals 1/2. The subsequent process, in this case the clinker burning, is identified by the reference numerals 2/3. The mineralogical and/or chemical composition of the raw meal and/or raw meal components ground during the preparation of the raw material 1 is analysed by the analysing means 16/25. The result of the analysis is communicated to a control means 7 which controls material diverters 40 in order to establish the filling of one specific or a plurality of raw meal silos/clinker silos. The control means 7 also monitors the filling level of each individual raw material silo/clinker silo by means of sensors 41.

Each of the raw material silos has an appertaining outlet proportioning device 42 which can be controlled in a targeted manner by way of the control means 7. In this way können one or a plurality of outlet proportioning devices 42 can be controlled in a targeted manner in order to deliver a stream of raw meal with a desired mineralogical and/or chemical composition to the subsequent clinker burning process. The raw meal composition is determined by the analysing means 25/26 ermittelt and used if need be for correction and/or adjustment of the outlet proportioning devices 42.

The plurality of raw meal silos or clinker silos increase the flexibility in the material composition. Therefore it is also possible to effect a corresponding correction of the raw meal composition during clinker burning in a very short time, for example when other fuels are used. It is also possible to carry out the most rapid possible change in the raw meal composition by the analysis of the burned clinker. Furthermore, fluctuations in the clinker composition can be compensated for by targeted mixing of clinker from two or more clinker silos.

During combined grinding an unwanted chemical composition which is separated according to grain sizes is frequently observed. However, with the bove installation it is possible to produce individual raw material components by separate grinding and storage. Bringing together separately ground raw material components ensures a better control of the chemical composition irrespective of the grindability. Also corrective components which are distinguished by a high concentration of a pricipal oxide or of a subsidiary component can be easily produced and stored separately for later corrections and and if need be can be added to the mixture with short dead times.

It is known that the cement clinker has a concentration of the clinker phases which differs according to grain size. It may therefore be provided that for the determination of the mineralogical and/or chemical composition of the raw meal/clinker the analysing means take samples which are fractionated according to grain size and/or density. It is also conceivable that the filling of the raw meal silo/clinker silo according to grain size and/or density is effected by fractionation by means of screening or sifting. Thus in particular individual diverters 40 can be provided with suitable means for screening or sifting.

The invention claimed is:

1. A method for the production of a hydraulic binding agent from a plurality of raw material components, comprising the steps of:
grinding first raw material components to a first raw meal with a first mineralogical and/or chemical composition, and subsequently grinding second raw material components to a second raw meal having a second mineralogical and/or chemical composition different from that of the first raw meal,
analyzing the mineralogical and/or chemical compositions of the first and second raw meals respectively,
providing first and second separate raw meal silos respectively for the analyzed first and second raw meals,
filling the first and second silos respectively with the analyzed first and second raw meals of different mineralogical and/or chemical compositions,
fixing a targeted composition of the first and second raw meals to be burned to form a clinker,
controlled extracting of the analyzed first and second raw meals from the first and second raw meal silos as a function of the analyzed first and second raw meal compositions,
transporting the targeted composition of the first and second raw meals to be burned directly to the combustion plant after the controlled extracting step and without further storage in a silo,
burning the targeted composition of the first and second raw meals to clinker in a combustion plant,
determining the mineralogical and/or chemical composition of the clinker,
using a targeted composition of the clinker for further control of the controlled extracting step of the analyzed first and second raw meals from the first and second raw meal silos, and
finally grinding the clinker together with further inter-grinding materials.

2. The method as claimed in claim 1, wherein said grinding step includes the steps of at least partially grinding individual raw material components separately, and then storing of the partially ground components in separate raw meal silos.

3. The method as claimed in any one of claim 1 or 2, wherein the analyzing of the mineralogical and/or chemical composition of the raw meal step includes the steps of taking and analyzing samples thereof which are fractionated according to grain size and/or density.

4. The method as claimed in any one of claim 1 or 2, wherein the filling of the raw meal silos step is carried out by fractioning, which fractioning step is accomplished by at least one of screening or sifting according to grain size and/or density.

5. A method for the production of a hydraulic binding agent from a plurality of raw material components, comprising the steps of:
grinding the plurality of raw material components to at least one raw meal,
burning the at least one raw meal to clinker in a combustion plant,
wherein the grinding and burning steps produce at least first and second clinkers having first and second mineralogical and/or chemical compositions different from one another,
analyzing the mineralogical and/or chemical composition of the first and second ground clinkers,
providing at least first and second separate clinker silos respectively for the first and second analyzed clinkers,
filling the first and second silos with first and second analyzed clinkers of different mineralogical and/or chemical composition,
fixing a targeted composition of a mixed clinker to be ground by a controlled extracting of the analyzed first and second clinkers from the first and second clinker silos as a function of the analyzed first and second clinker compositions, and
grinding the targeted composition of the first and second clinkers together with further inter-grinding materials.

6. The method as claimed in claim 5, further including the step of controlling, using the targeted composition of the first and second clinker, an extraction of a plurality of different analyzed raw meals from a plurality of raw meal silos.

7. The method as claimed in claim 5, further including the step of regulating the filling of the first and second clinker silos and the extracting of the first and second clinker from the first and second clinker silos as a function of a targeted mineralogical and/or chemical composition of the cement to be created.

8. The method as claimed in one of claims 5-7, wherein said analyzing of the first and second clinker step includes the step of taking and analyzing samples thereof which are fractionated according to grain size and/or density.

9. The method as claimed in any one of claims 5-7, wherein the filling of the clinker silos step is carried out by fractionating, which fractioning step is accomplished by at least one of screening or sifting according to grain size and/or density.

10. The method as claimed in any one of claims 5-7, further including the step of delivering the first and second clinker to be ground directly to the cement grinding installation after the controlled extraction from one or a plurality of clinker silos and without further storage in a silo.

* * * * *